(12) United States Patent
Paleja et al.

(10) Patent No.: US 8,719,376 B2
(45) Date of Patent: May 6, 2014

(54) REMOTE DOWNLOAD OF CONTENT

(75) Inventors: Ameesh Paleja, Lynnwood, WA (US);
Ethan Z. Evans, Snoqualmie, WA (US);
Kenneth John Railey, Seattle, WA (US);
Gregory Alan Rubin, Seattle, WA (US);
Roy F. Price, Seattle, WA (US); Douglas Frederick Aley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/598,459

(22) Filed: Aug. 29, 2012

(65) Prior Publication Data

US 2012/0324052 A1    Dec. 20, 2012

Related U.S. Application Data

(63) Continuation of application No. 11/616,224, filed on Dec. 26, 2006, now Pat. No. 8,260,881.

(60) Provisional application No. 60/824,763, filed on Sep. 6, 2006.

(51) Int. Cl.
*G06F 15/16* (2006.01)
*G06F 15/173* (2006.01)
*G06F 15/177* (2006.01)

(52) U.S. Cl.
USPC .......................................... 709/218; 709/217

(58) Field of Classification Search
USPC ................................................ 709/217–218
See application file for complete search history.

(56) References Cited

U.S. PATENT DOCUMENTS

| 7,536,725 | B2 |   | 5/2009 | Raciborski |  |
| 7,565,414 | B1 | * | 7/2009 | Love | 709/219 |
| 7,783,729 | B1 | * | 8/2010 | Macaluso | 709/220 |
| 2002/0049853 | A1 |   | 4/2002 | Chu et al. |  |
| 2002/0143607 | A1 |   | 10/2002 | Connelly |  |
| 2004/0024688 | A1 |   | 2/2004 | Bi et al. |  |
| 2004/0062130 | A1 |   | 4/2004 | Chiang |  |
| 2004/0098592 | A1 | * | 5/2004 | Taki | 713/176 |
| 2004/0117853 | A1 |   | 6/2004 | Karaoguz et al. |  |
| 2004/0199809 | A1 |   | 10/2004 | Hanam et al. |  |
| 2004/0253945 | A1 | * | 12/2004 | Janik | 455/419 |
| 2005/0018695 | A1 |   | 1/2005 | Ramaswamy et al. |  |
| 2005/0114470 | A1 | * | 5/2005 | Bal | 709/219 |
| 2007/0130585 | A1 |   | 6/2007 | Perret et al. |  |
| 2007/0130594 | A1 |   | 6/2007 | Hidary et al. |  |
| 2008/0147214 | A1 |   | 6/2008 | Lee et al. |  |
| 2008/0235360 | A1 |   | 9/2008 | Li et al. |  |

FOREIGN PATENT DOCUMENTS

WO    WO 2006-085843    8/2006

* cited by examiner

*Primary Examiner* — Chau Le
(74) *Attorney, Agent, or Firm* — Knobbe, Martens, Olson & Bear, LLP

(57) ABSTRACT

A system and method for delivering content is disclosed. A content download service initially registers client computing devices to receive content. Therefore, when the content download service receives a request from a requesting client computing device to download content to a receiving client computing device, the content or download instructions are sent to the receiving client computing device. Downloading is controlled by the content download service and a software agent installed on the receiving client computing devices when they are registered. Content request and content download occur over a computer network, such as the Internet. The content may be stored by the content download service and supplied to the receiving client computing device by the download service, or stored by a content supply service and supplied to the receiving client computing device either directly or via the content download service.

20 Claims, 11 Drawing Sheets

REMOTE DOWNLOAD OF CONTENT

CROSS-REFERENCE TO RELATED APPLICATIONS

This application claims the benefit of U.S. Provisional Patent Application No. 60/824,763, filed Sep. 6, 2006, entitled REMOTE DOWNLOAD OF CONTENT, the disclosure of which is hereby expressly incorporated by reference, and the filing date of which is hereby claimed under 35 U.S.C. §119(e). This application is a continuation of U.S. patent application Ser. No. 11/616,224, filed Dec. 26, 2006, and entitled "REMOTE DOWNLOAD OF CONTENT," the disclosure of which is herein incorporated by reference in its entirety.

FIELD

The present invention relates to the downloading of content via a communication network. More specifically, the present invention relates to systems and methods for managing the download of content from a content server to various types of computing devices via a communication network.

BACKGROUND

Advances in data capture, storage, and communication technologies have made vast amounts of data, including multimedia data, available to both commercial and non-commercial, i.e., individual, customers. Advances in processing power and increases in communication bandwidth have made the downloading of multimedia data, primarily over the Internet, more practical and prevalent. Many Internet computer software applications, such as media player software applications, provide customers easy access to multimedia data, i.e., audio-visual data, such as movies and music. The same and/or other computer software applications, such as electronic mail (e-mail) and data download software applications, facilitate the downloading of the software components required by a receiving computing device to receive multimedia and other types of data. As a result of the above-mentioned advances, the downloading of multimedia and other types of data via communication networks, such as the Internet, has become prolific.

In addition to the downloading of multimedia and other data (referred to as content) to desktop and laptop type computing devices, content is frequently downloaded to other types of computing devices, such as personal digital assistants (PDAs), and cellular telephones, for example.

Many individuals have more than one computing device, each designed for a different purpose, that are in communication over the Internet as well as other networks, depending on the use of the computing device. For example, a person employed by a business may have a desktop computing device in the office and/or a laptop computing device for use when traveling, plus a PDA and a cellular telephone. The same individual may have a desktop and/or a laptop computing device at home as well as his or her own personal PDA and cellular telephone. In many instances, all of these computing devices are capable of communicating with one another via the Internet.

When the downloading of multimedia or other data is desired, a user creates an Internet connection between the computing device that is to receive the download (commonly called a client computing device) and a Web server that stores the data. Typically, the connection is made using a Web browser. After the connection is made, the data is delivered to the client computing device requesting the data. While such downloading is satisfactory in some circumstances, it may not be in other circumstances. For users who have access to multiple computing devices, it is often advantageous to use one computing device to request that multimedia data and/or software be downloaded to a different computing device. For example, a user at work may become aware of a movie or music of interest to the user. In the past it would have been necessary for the user to access the computing device to which the user wants to download the movie or music. If the computing device is the user's home computer, in the past, the user has had to wait until arriving home to make the required connection, and then wait for the movie, music or other data to be downloaded. Even with the advances and processing power that have occurred, downloading time, particularly with respect to movies or other large audio-video data files, can be extremely time consuming. Thus, it would be advantageous for users to be able to use one computing device to request the downloading of various types of content, such as audio-video data files (movies, music, etc.), software, etc., to another computing device to which the user has no immediate access.

SUMMARY

This summary is provided to introduce a selection of concepts in a simplified form that are further described below in the detailed description. This summary is not intended to identify key features of the claimed subject matter, nor is it intended to be used as an aid in determining the scope of the claimed subject matter.

Methods, systems and computer-readable medium for downloading content requested by one computing device (requesting computing device) to another computing device (receiving computing device), i.e., remote downloading of content, is disclosed. In one illustrative implementation, one or more receiving computing devices are registered by a user with a content download service. The receiving computing device or devices can be registered by a receiving computing device, by the requesting computing device or by some other computing device configured to communicate with the content download service. Thereafter, in response to a content download request received by the content download service from the requesting computing device, content is downloaded to a receiving computing device selected by the requesting computing device. Depending on implementation details, the content can be downloaded in various ways. As soon as the request is received by the content download service, the contact download service can determine if the content is available for download and, if available, seek to contact the receiving computing device to determine if the receiving computing device is available to receive the content. If the receiving computing device is available to receive content, the content is downloaded to the receiving computing device. Alternatively, after determining if the content is available for downloading, the content download service waits until a download status check is received from the receiving computing device that is designed to determine if the content download service has content to download. Upon receipt of the status check, the content download service advises the receiving computing device that it has content to download, and downloads the content. Again, depending on implementation, the content can be downloaded by the content download service, or the content download service can authorize a content supply service to download the content directly to the receiving computing device. Preferably, communication between the requesting computing device, the receiving computing device and the content download service is performed in a secure manner, particularly if payment information, such as credit card information, is included in the communication.

In accordance with another aspect, a software agent is provided to each receiving computing device when the receiving computing device is registered with the content download service. The software agents control the downloading of content to the receiving computing devices.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The disclosed subject matter was developed for remotely downloading content ordered by one computing device to another computing device via the Internet and is described in an Internet environment. However, it is to be understood that the invention may also find use in network environments other than the Internet and, thus, should not be construed as Internet limited.

As will be better understood from the following description, remote downloading is accomplished by a user first registering one or more receiving computing devices with a content download supplier. After registration, a user can request, from any computing device capable of communicating with the download content supplier, the downloading of content to a receiving computing device identified by the user. Thereafter, content is downloaded under the control of a software agent installed on the receiving computing device when the receiving computing device is registered. For ease of understanding, in accordance with conventional client/server terminology, download requesting computing devices are hereinafter called "requesting client devices" and receiving computing devices are called "receiving client drives." Content suppliers are called services. Services include at least one and more usually multiple servers. Although conventional client/server terminology is used herein to describe illustrative embodiments of the invention, those skilled in the art will recognize that in other embodiments, peer-to-peer network configuration may be employed.

Figure 1:
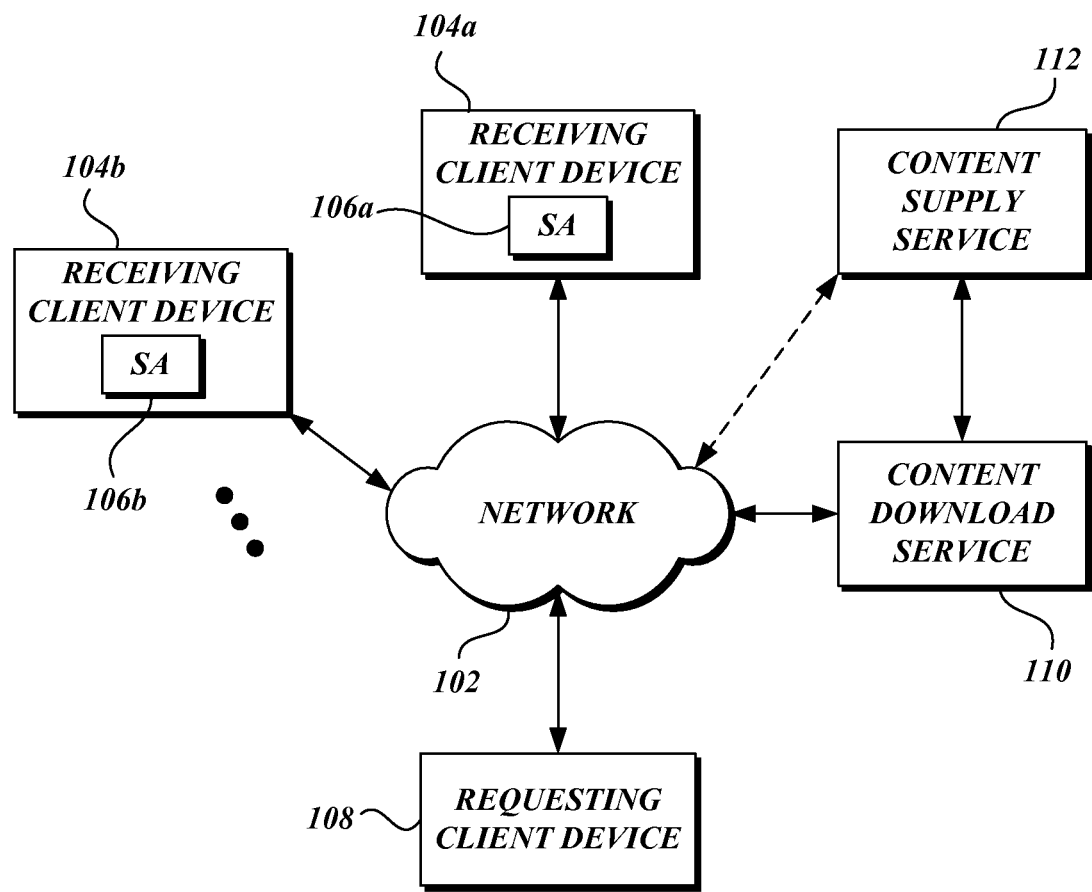
FIG. 1 is a block diagram of the main components of an illustrative system for facilitating the remote downloading of content.

FIG. 1 is a block diagram of the main components of an illustrative system for facilitating the remote downloading of content. More specifically, FIG. 1 includes a network 102, such as the Internet, a requesting client (computing) device 108, a plurality of receiving client (computing) devices 104a, 104b, . . . , each of which includes a software agent (SA) 106a, 106b . . . , a content download service 110 and a content supply service 112. As well known to those familiar with the Internet and clients and servers connected to the Internet, the requesting client device 108, the receiving client devices 104a, 104b . . . , and the content download service 110 communicate with one another via the Internet 102 using suitable protocols, namely the Hypertext Transfer Protocol (HTTP) and the Transmission Control Protocol/Internet Protocol (TCP/IP). The client computing devices, i.e., the requesting client device 108 and the receiving client devices 104a, 104b . . . , can take on various forms such as desktop computers, laptop computers, electronic book readers, mobile computing devices (i.e., PDAs), mobile phones, etc. The content download service and the content supply service can also take on various forms, normally one or more server computing devices (i.e., servers). Obviously, FIG. 1 represents only a very, very small portion of the Internet and the clients and servers that communicate via the Internet, which comprises a huge number of clients, servers, routers, etc., all well known to those skilled in the art.

Figure 3:
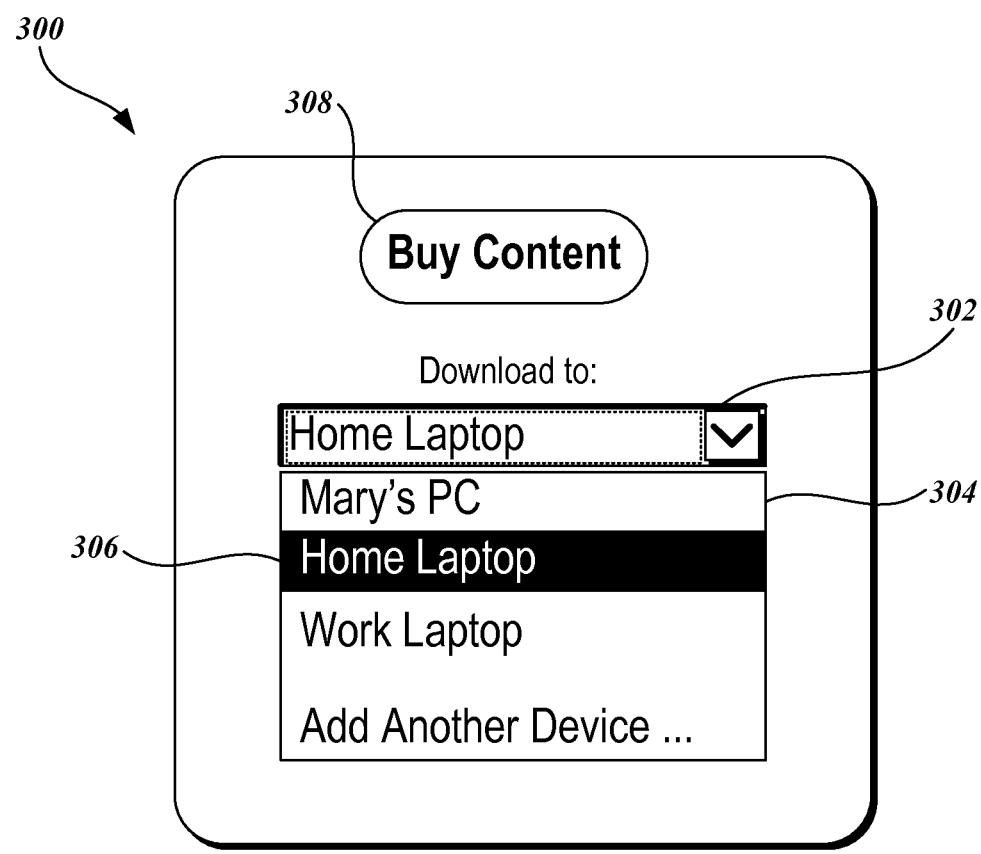
FIG. 3 is a pictorial diagram depicting a illustrative user interface for selecting a receiving client device.

Each receiving client device 104a, 104b . . . , is associated with a user through a registration process. More specifically, each receiving client device 104a, 104b . . . , is registered as associated with a user. Alternatively, more than one receiving client device is registered as associated with a single user, or multiple users may be registered as associated with a single receiving client device. Registration may be accomplished by a user contacting the content download service 110. User contact may be accomplished via the requesting client device 108, a receiving client device 104a, 104b . . . , or via some other computing device not shown in FIG. 1. In a conventional manner, registration is accomplished by supplying the content download service with user identification information, such as a user account number (or information adequate to open an account if the user has not established an account) and information that identifies the receiving client device or devices to receive user requested content downloads. The receiving client device identification information may be associated with computer descriptive titles as shown in FIG. 3 and described below. The receiving client identification information is then used by the content download service to contact and install a software agent (SA) 106a, 106b . . . , on the registered receiving client devices 104a, 104b . . . .

The software agents 106a, 106b . . . , may include a user interface for configuring the downloading of content and/or rendering downloaded content on the receiving client device 104. As noted above, a user may be associated with any number of receiving client devices. Alternatively, two or more users may be associated with the same receiving client device. In such an embodiment, all associated users may share the same software agent or, alternatively, each user may be associated with a separate software agent.

The requesting client device 108 is, preferably, a computing device with a browser software application suitable for accessing Web sites enabled to remotely download content, i.e., the servers of the content download service. Alternatively, the requesting client device 108 can take the form of any other computing device (i.e., PDA, mobile telephone, etc.) suitable for transmitting a download request to the content download via any one of a variety of well-known communication protocols.

In addition to registering receiving client devices associated with users, the content download service 110 facilitates the downloading of content to registered receiving client devices 104a, 104b . . . . The content download service 110 facilitates the content downloading by processing content download requests and instructing the registered receiving client device designated to receive content to begin downloading content in accordance with the download request. The content download service 110 may access a variety of Web sites and supply a list of content available for download in a form suitable for displaying by a Web browser. The content download service 110 may also be configured to provide direct advertising, streaming radio, promotional materials, etc., to users. The content download service 110 may include a data store that stores user preferences and/or configuration information and use the stored information to send desired announcements to users, such as the Internet availability of a recently released movie in a particular movie category.

The content download service 110 may be associated with a content supply service 112, which stores content suitable for downloading to the receiving client devices 104a, 104b . . . . As hereinafter described with respect to FIGS. 2A-2C, the receiving client device 104 may act as a conduit during the downloading of content. Alternatively, as hereinafter described with respect to FIGS. 2D-2E, content may be downloaded directly from the content supply service 112. The content supply service 112 may comprise a number of commercial servers that subscribe to a content delivery network service that sells, or otherwise provides, content to various types of client devices. Alternatively, the content supply service 112 may comprise data warehouses associated with the content download service 110. In general, the content supply service 112 may comprise any data source accessible by the content download service 110 and/or receiving client devices 104a, 104b . . . .

Figure 2A:
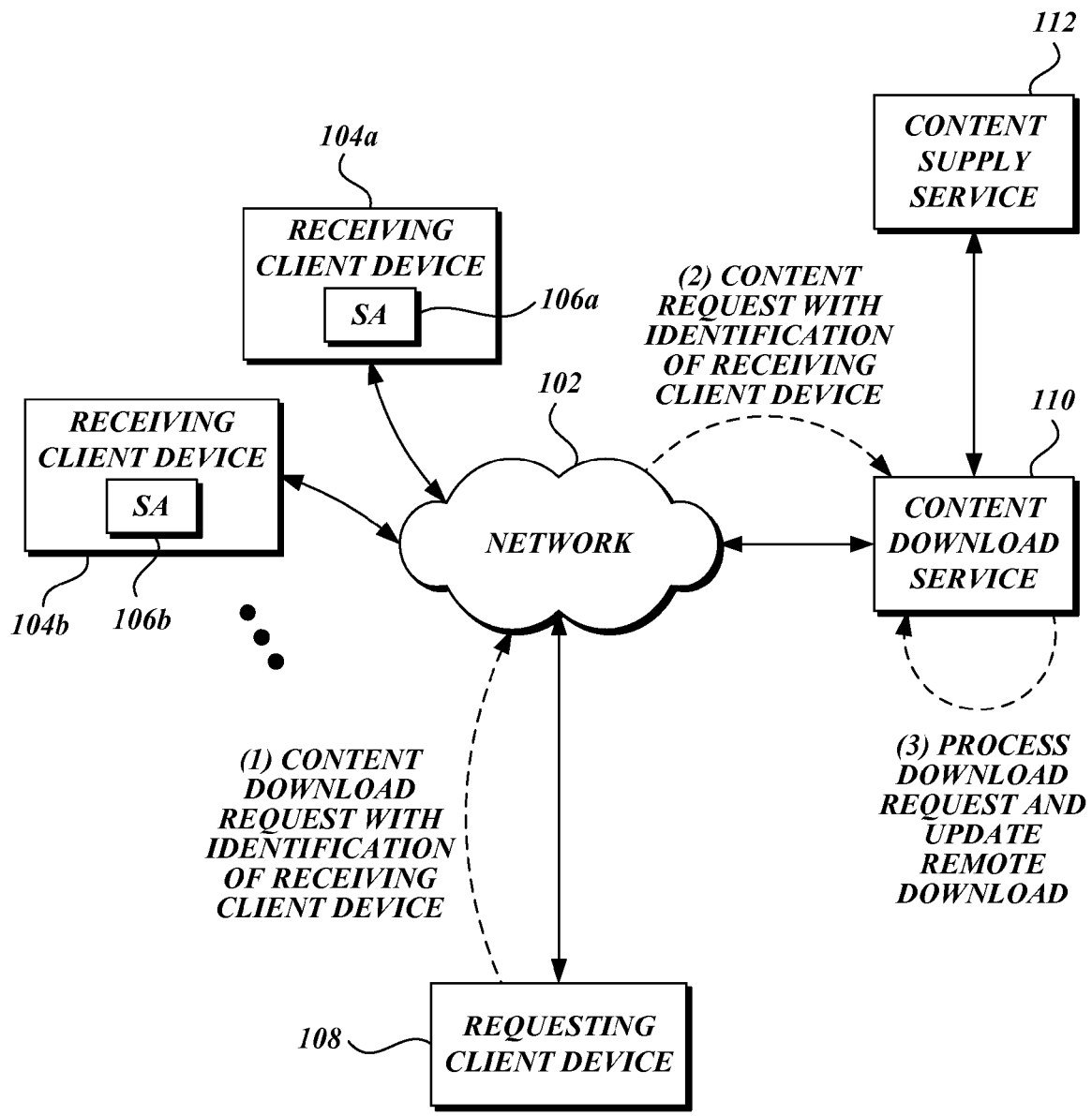
FIGS. 2A-2C are a series of block diagrams of the illustrative system of FIG. 1 depicting the downloading of content requested by one computing device to a different computing device.
Figure 2B:
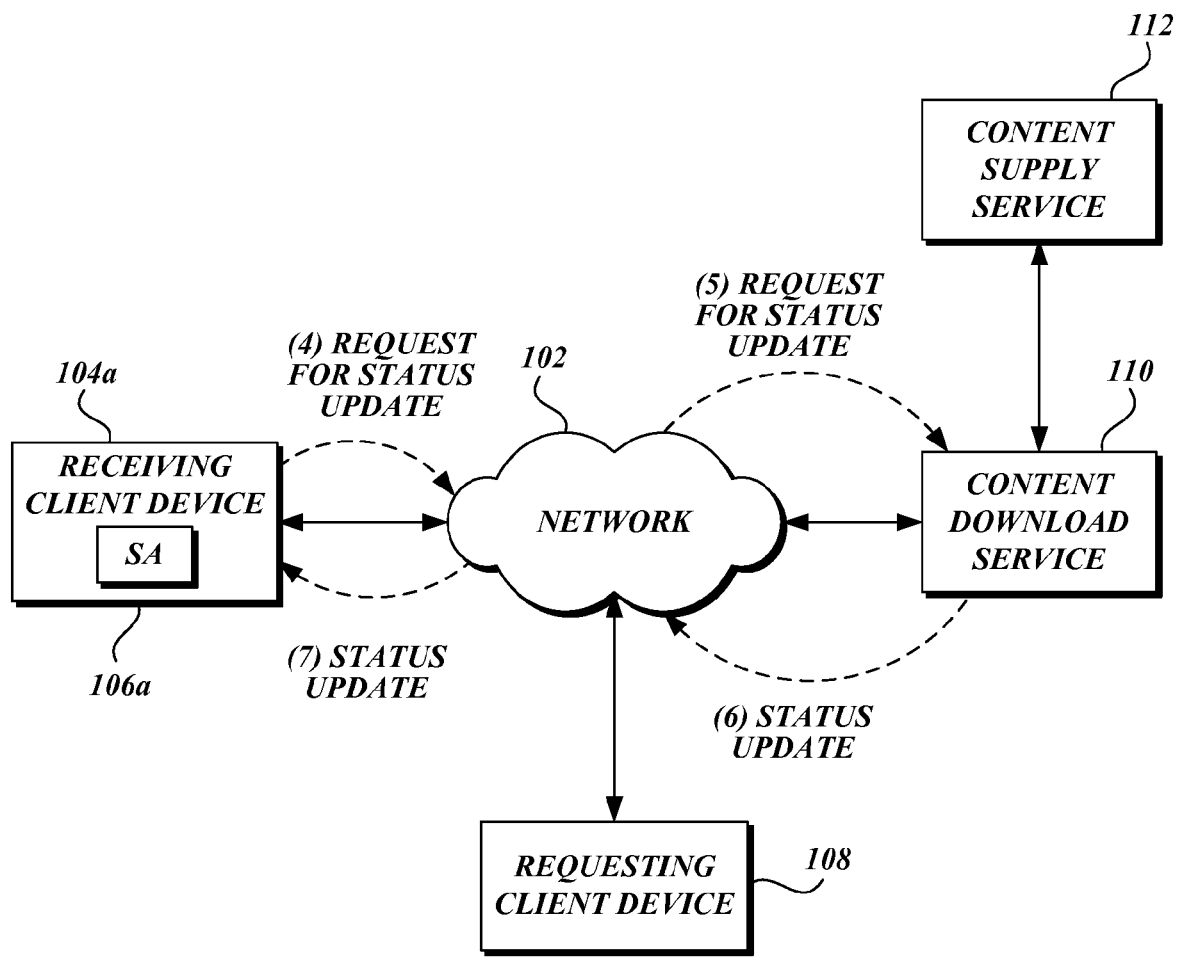
Figure 2C:
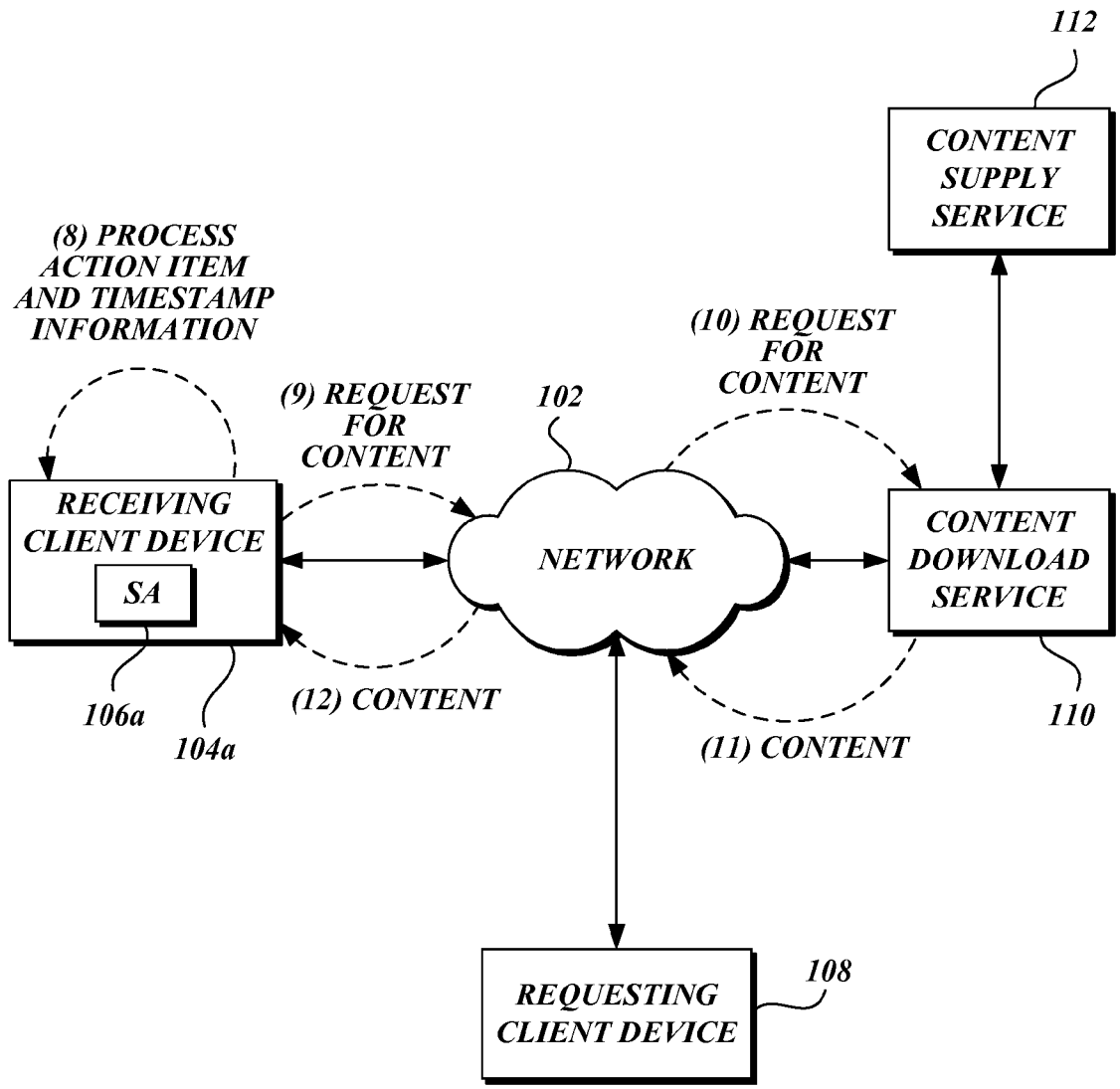

FIGS. 2A-2C illustrate the interaction between the components of the illustrative system shown in FIG. 1 when the requesting client device 108 requests that content be downloaded to one of the receiving client devices 104a. FIG. 2A illustrates the initiation of the remote content download request. The remote content download request begins by the requesting client device, which, as noted above, may be a desktop or laptop computer, a PDA, a mobile telephone, etc., transmitting a download request that includes an identification of the receiving client device. More specifically, the "request" identifies the content to be downloaded and the registered device that is to receive the content download. While shown as a one-step process, the actual process may include more than one step. The requesting client device may first open a communication channel with the content download service, followed by a request to review available content in a particular category, followed by a solution of the content, followed by the selection of a receiving client device to receive the content.

Regardless of the number of steps, as shown by (1) and (2) the request is sent to the content download service 110 via the network 102. If the network 102 is the Internet, the requesting client device 108 may send the content request via the network 102 to the content download service 110 using HTTP (Hypertext Transfer Protocol) packets. Alternatively, rather than using HTTP, the requesting client device 108 may use a proprietary protocol to communicate via the network 102 with the content download service 110. As shown by (3), the content download service 110 processes the content download request. Among other actions, the content download service 110 may send a message to the requesting client device 108 indicating whether the requested content is available after, for example, checking the content supply service 112. The message may cause the software agent to generate a user interface on the requesting client device 108 that provides user options if the requested content is not available. The options may include, for example, the ability to choose other content to be downloaded or a list of other content closely related or similar to the originally-requested content, for example.

The content download service 110 may maintain a list of content available from the content supply service 112, which can be checked quickly to ascertain availability of content. The requesting client device 108 may request that content be downloaded to a single receiving client device 104a. Alternatively, the requesting client device 108 may request that the same content be downloaded to multiple receiving client devices 104a, 104b . . . . Still further, the requesting client device 108 may request that multiple content, e.g., several movies, be downloaded to one or more receiving client devices 104a, 104b . . . . The interface may include other options for any of the above-mentioned downloading content scenarios for downloading content to one or more receiving client devices 104. One illustrative option is allowing the requesting client device 108 to request that content to be downloaded to the one or more receiving client devices 104a, 104b . . . , at a future scheduled delivery time.

As noted above, before a requesting client device 108 can request that content be downloaded to one or more receiving client devices 104a, 104b . . . , the one or more receiving client devices 104a, 104b . . . must be registered with the content download service 110. FIG. 3 is a pictorial diagram depicting an illustrative user interface window 300 that allows a user to select a receiving client device from a plurality of registered receiving client devices. More specifically, the user interface window 300 illustrated in FIG. 3 includes a drop-down pick list 302 that allows a user to select a receiving client device 104a, 104b . . . . The pick list 302 presents an easily understandable list of receiving client devices 104, such as a home laptop or a work laptop, or receiving client device dedicated to some specific individual (Mary's PC). A mouse controlled cursor is used in a conventional manner to highlight the selected client receiving device, the home laptop in the FIG. 3 example. The user interface 300 also includes a button that is used to purchase the content to be provided by the content download service provider 110. (The content is selected using other user interfaces, not shown.) When the purchase button, i.e., the Buy Content button 308, is activated by a mouse for example, a content download request is sent to the content download service 110. While not relevant to the present disclosure, the user's account is debited with a purchase charge.

In addition to a drop-down list of receiving client devices, the drop-down list also includes an entry titled "Add Another Device." When the Add Another Device entry is selected, another user interface window (not shown) opens that allows a user to add another receiving client device to the drop-down list. The other window includes areas for a user to enter receiving client device identification information and choose or enter a title for the receiving client device, such as those shown in FIG. 3. The user interface window 300 (or other selectable user interface windows) may present additional information, such as a calendar (not shown), that can be used to schedule the downloading of requested content to a selected receiving client device 104a, 104b . . . . Those skilled in the art will appreciate that the user interface window 300

(or other windows) may present many other options to the user of the requesting client device 108.

FIG. 2B is a block diagram of the FIG. 1 system that illustrates the status of polling of the content download service by a computing device 104a to determine if content is available for download. More specifically, in this illustrative embodiment, the software agent of each registered receiving client device polls the content download service to determine whether the download status associated with the polling receiving client device has changed. The service provider returns status updates. Preferably, the status updates include an action code or codes, a timestamp associated with the action code or codes and a new polling interval. Alternatively, the polling interval may be determined by the software agent and not included in the status updated. If an action code corresponding to the time stamp has been executed, the receiving client device does not conduct any further action. If an action code corresponding to the timestamp has not been completed, the receiving client device initiates additional action based on the nature of the action code or codes. The action codes correspond to content downloads, software updates, promotional downloads, etc.

While in some environments, rather than requiring receiving client devices to poll the content download service, the content download service 110 may directly notify the receiving client device 104a (via a wireless service, for example) that a status update awaits the receiving client device 104a, such a process will not work in some environments. In some environments, direct notifications cannot be received by receiving client devices because direct notifications will not pass through firewalls designed to prevent unwanted access to protect against malware and other undesirable external contact. In such environments, the receiving client devices must periodically poll the content download service 110 for status updates. Depending on implementation, the receiving client device 104a may use a persistent connection to poll the content download service 110 and receive updates. A persistent connection is typically established between a receiving device and a service provider using a protocol to establish a communication channel. For example, a connection oriented communication channel may be established using handshaking at the beginning of a communication session, which establishes communication parameters such as data rates and data formats.

Regardless of the type of communication, in the embodiment shown in FIG. 2B, the receiving client devices, such as receiving client device 104a poll, i.e., send requests for status updates to the content download service 110 via the network 102 as shown by (4) and (5). In response, the content download service 110 sends the polling receiving client device a status update as shown by (6) and (7). After a status update is received by the polling receiving client device 104a, as shown in FIG. 2c and described next, the polling receiving client device 104a sends a request for content to the content download service 110 if the status update includes an action code indicating that content is available for downloading as a result of a request from the requesting client device 108.

FIG. 2C is a block diagram of the FIG. 1 system illustrating the downloading of content by a receiving client device 104a. Initially, as shown by (8), action items and timestamp information contained in a received status update (FIG. 2B) are processed. If the processing indicates that a content download action item has not been completed, the receiving client device 104a sends a request for content to be downloaded to the content download service 110, as shown by (9) and (10). In response, the content download service 110 returns the content as shown by (11) and (12). The content to be downloaded can be stored by the content download service 110 or stored by a content supply service 112 accessible by the content download service 110 either directly as shown in FIG. 2C or via the network 102 (not shown).

During the downloading of content to a receiving client device 104a, various problems can arise similar to those that can arise in any content downloading environment. For example, the capacity of the memory of the receiving client device 104a may be insufficient to download the requested content. For instance, if multimedia content, such as a movie, is being downloaded to the receiving client device 104, the available capacity of the memory, e.g., the disk in the case of a personal computer, of the receiving client device 104 may not be sufficient to hold the entire movie. In such situations, an error report may be produced by the software agent 106a, or by the content download service 110 and transmitted to the software agent of the requesting client device 108 for display. If in process, the content download service 110 may stop the download and update the status of the receiving client device 104a stored on the content download service to include an indication of the need for subsequent action. For example, the action reported the next time the client receiving device 104a is polled may indicate that the remaining portion of the requested content, i.e., the movie, may be downloaded by the receiving client device 104. When data stored in the memory of the receiving client device is removed to make more capacity available. Alternatively, the content download service 110 may terminate the downloading of the requested content, update the stored status for the receiving client device 104a, and notify the requesting client device 108 of the download failure. Another type of problem that may occur during the downloading of content to the receiving client device 104a includes communication channel problems, such as communication bandwidth. In such cases, the content download service provider 110 may throttle the downloading of content to the receiving client device 104a by changing the download data rate to accommodate the communication channel problems.

In one illustrative implementation, the requesting client device 108 may send a request to the content download service 110 to download a portion of a content to the receiving client device 104a. In another illustrative implementation, the requesting client device 108 may send a request to the content download service 110 to download a portion of content at a designated date and time or download content in segments at different dates and/or times. This way, the download of large amounts of content may be scheduled appropriately as to not overload the receiving client device 104a. Additionally, if the content requested to be downloaded is of a serial nature, such as a regularly produced program like a TV series, the download of the content may be scheduled to be synchronized with the availability of the content. When the requested content has been successfully downloaded to the receiving client device 104a, the remote download process ends.

Figure 2D:
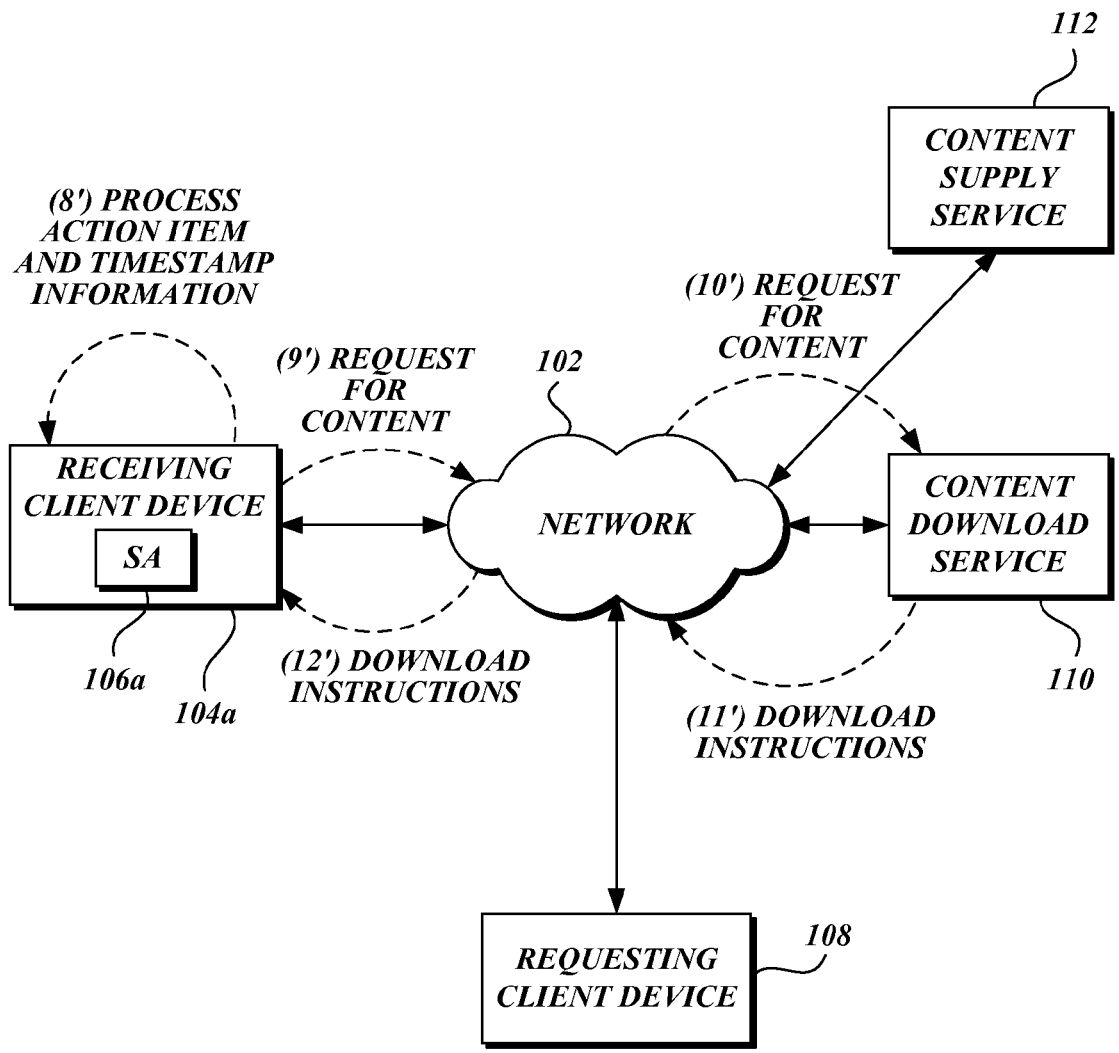
FIGS. 2D-2E are a series of block diagrams equivalent to FIG. 2C depicting an alternate download process.
Figure 2E:
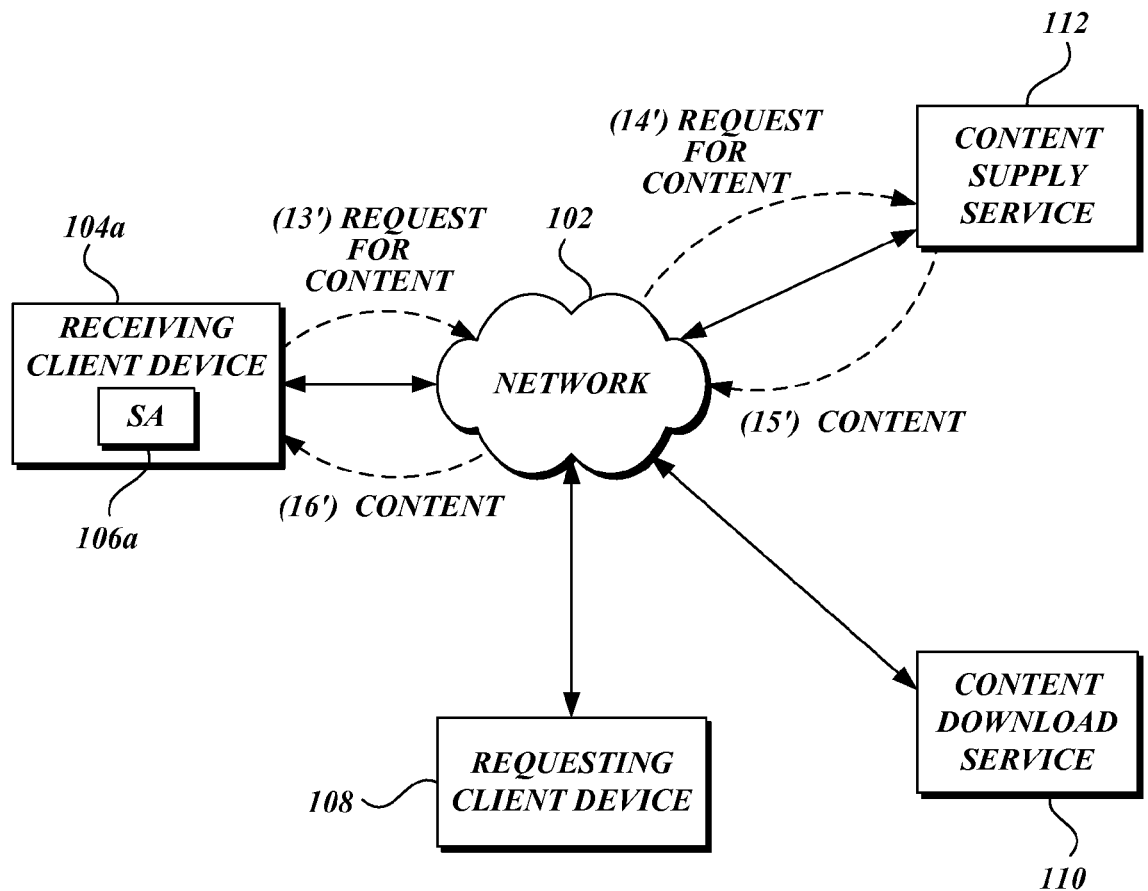

Rather than the content download service downloading content to a receiving client device that is obtained from a content supply service, the content may be supplied directly by the content supply service to a receiving client device. Such a process is illustrated in FIGS. 2D and 2E and described next. In essence, FIGS. 2D and 2E replace FIG. 2C, FIGS. 2A and 2B being the same.

More specifically, as shown in FIG. 2C, the process of requesting content from the content download service 110 is substantially the same, except that download instructions, not content, is provided by the content download service provider 110, as shown by (9'), (10'), (11'), and (12'). The download instructions identify a source of the requested content and include authorization for the content supply service 112 to download the content to the receiving client device 104a. As shown in FIG. 2E, in response to receipt of the download instructions, the client receiving device 104a sends a request for content to the content supply source 112 via the network 102 as shown by (13') and (14'). After verifying the authorization included in the request, the content supply service supplies the requested content via the network as shown by (15') and (16'). Alternatively, the authorization to download content to the receiving client device 104a may be communicated directly from the content download service 110 to the content supply service 112. Depending on implementation, the authorization for content download may take the form of a digital certificate. Alternatively, the authorization for content download may comprise a user name and password previously registered with the content supply service 112. The digital certificate or the user name and password may be included in the request for content sent to the content supply service 112 by the receiving client device 104a (FIG. 2E). After the authorization included in the request for download content to the receiving client device 104 is validated, the content is downloaded from the content supply service 112 over the network 102 directly to the receiving client device 104, as illustrated in FIG. 2E and described above. The various problems that may arise during the transmission of content from the content supply service 112 directly to the receiving client device 104, examples of which are described above, with respect to FIG. 2C, are handled in a conventional manner, with suitable process changes.

Figure 4:
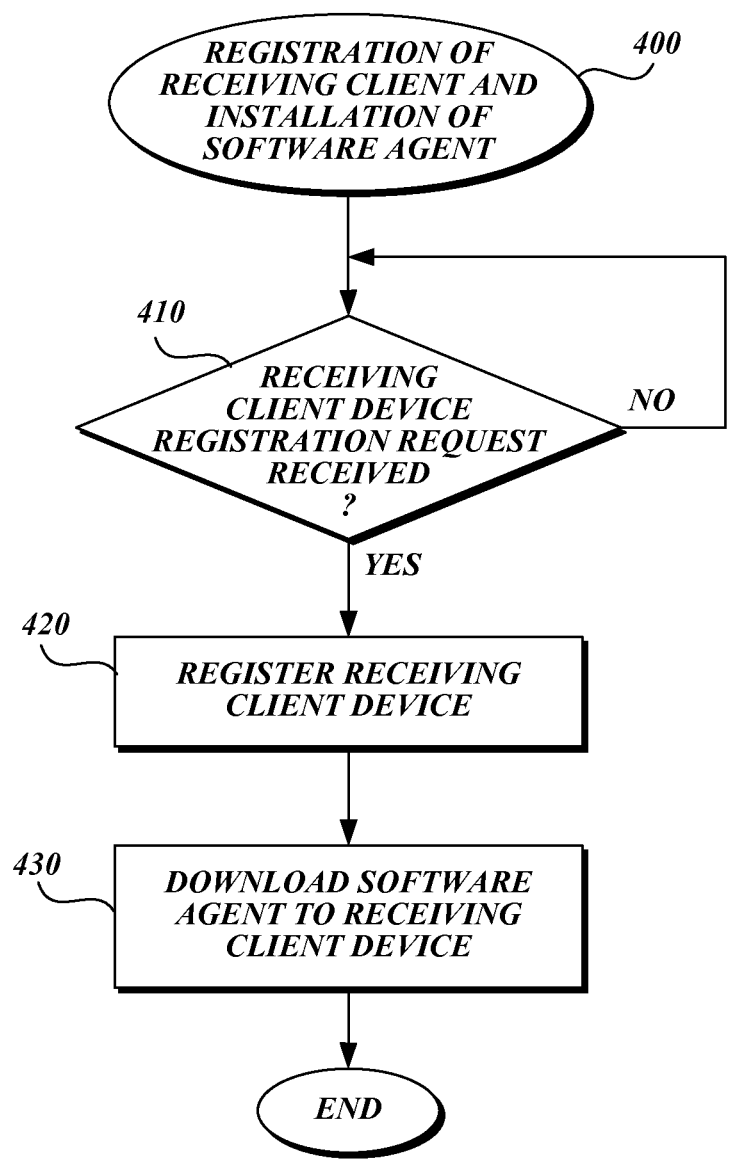
FIG. 4 is a functional flow diagram depicting an illustrative process for registering a receiving client device and the installation of a software agent on the registered receiving client device.

FIG. 4 is a functional flow diagram depicting an illustrative process for registering a receiving client device and installing a software agent on a registered receiving client device. Initially, the content download service is in a wait loop, waiting for a receiving client device registration request to be received 410. When a receiving client device registration request is received, the receiving client device is registered 420. This involves storing information that identifies the receiving client device, associating the identification information with the user requesting registration and, if desired, associating the information with an easily understandable client device identifier, such as one of the identifiers shown in FIG. 3 and described above. Then a suitable software agent is downloaded to the now registered receiving client device for installation on the receiving client device 430. This involves the content download service opening a communication channel to the receiving client device and sending the software agent to the receiving client device.

Figure 5:
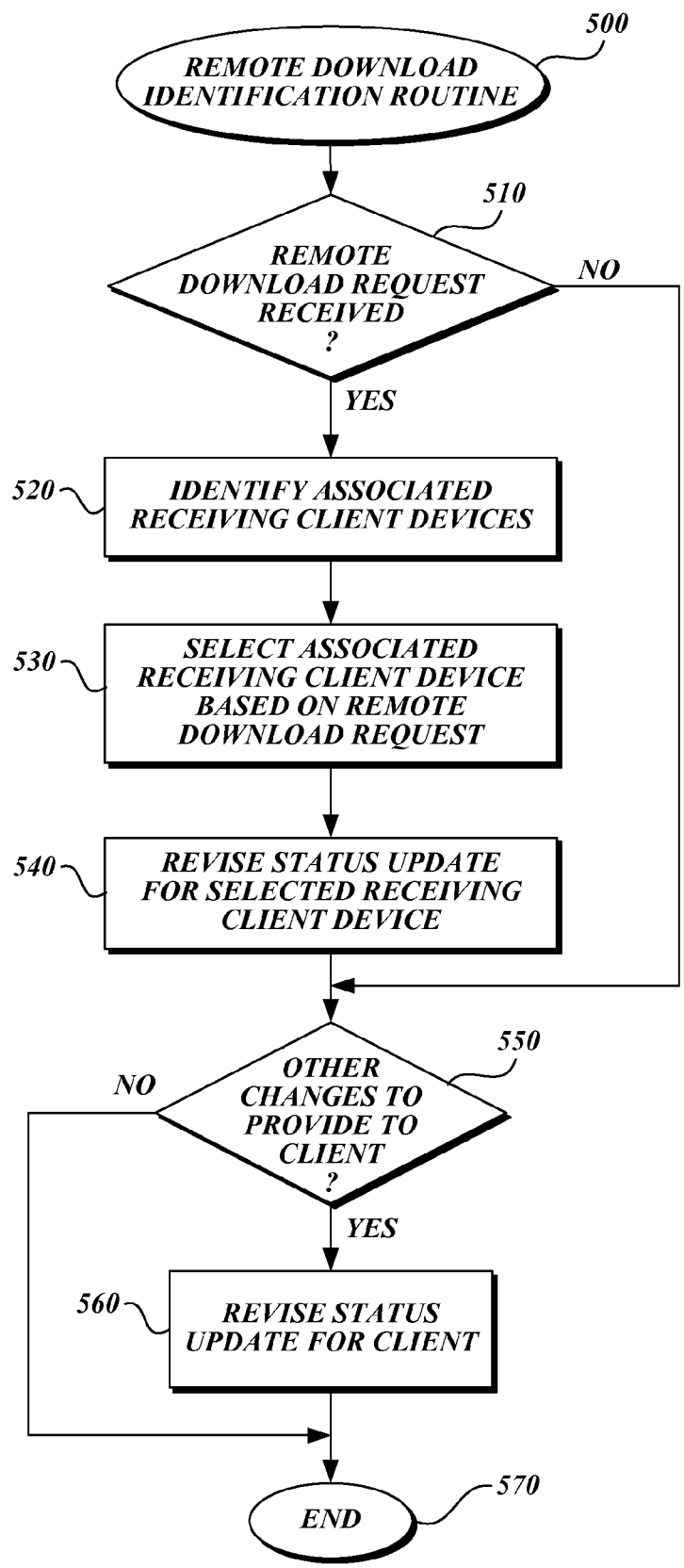
FIG. 5 is a functional flow diagram depicting an illustrative process employed by a content download service to identify a receiving client device.

FIG. 5 is a functional flow diagram depicting an illustrative process employed by the content download service 110 to identify a receiving client device, for example, one of the receiving client devices 104a, 104b . . . in FIG. 1, to receive content. The remote download identification routine starts at block 500 and proceeds to decision block 510, where the content download service 110 determines whether a remote download request has been received from a requesting client device 108. If a new content download request has been received, the routine proceeds to block 520, where the content download service 110 identifies a list of registered receiving client devices 104 associated with the user of the requesting client device 108. As noted above, a list of receiving client devices 104 may be created using the "Add Another Device" feature of the interface window 300 sent to the requesting client device 108 by the content download service 110. Next, in block 530, the content download service 110 selects the associated receiving client device 104a based on the remote download request received from the requesting client device 108 via the interface window 300, for example. Then, in block 540, the content download service 110 updates the status for the selected receiving client device 104a to be retrieved next time the receiving client device 104a polls the content download service 110. If no remote download request has been received (block 510) or after a status update has been revised (block 540), in decision block 550, the content download service provider 110 determines whether there are other changes that need to be reflected in the status update for the receiving client device 104a. Such changes may include scheduling information, information about new sources of download, and authorization information, such as new certificates. If no other changes are required, the process proceeds to block 570, where it terminates. If other changes are required, the process proceeds to block 560, where the status update is revised to include the other changes. After the status update for the receiving client device 104a has been revised, the status update is ready for retrieval by the receiving client device 104a during the next polling or ready for direct transmission to the receiving client device 104a.

As noted above with respect to FIG. 2A, the actions encompassed by blocks 520 and 530 may require several back and forth messages between the requesting client device 108 and the content download service 110. Thus, these blocks, like all of the other blocks in FIG. 5, and the blocks of the other functional flow diagrams should be construed as illustrative and not as limiting.

Figure 6:
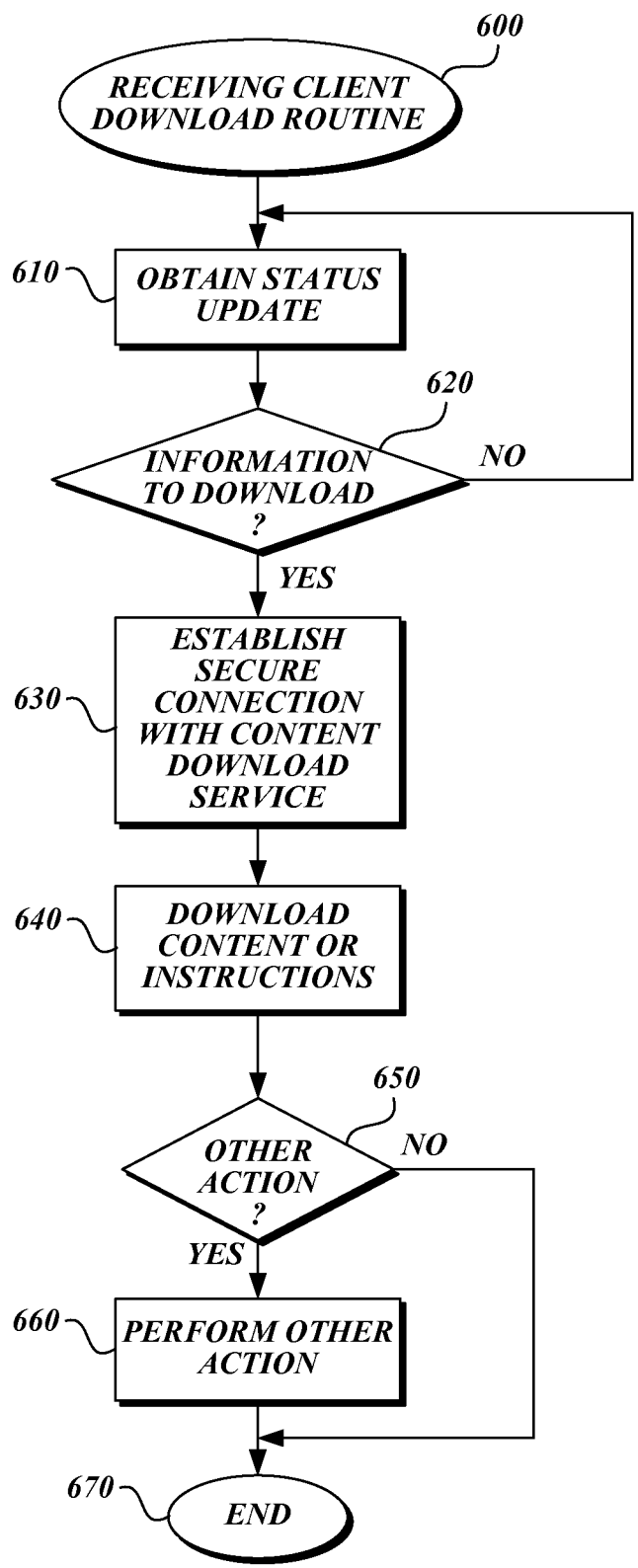
FIG. 6 is a functional flow diagram depicting an illustrative process employed by a receiving client device to control the downloading of content to the receiving client device.

FIG. 6 is a functional flow diagram depicting an illustrative process employed by a receiving client device to control the downloading of content to the receiving client device. The receiving client download process starts at block 600 and proceeds to block 610, where the receiving client device 104a obtains the status update. As noted above, the receiving client device 104a may obtain status updates by a number of techniques, such as polling, notification, and via a persistent communication channel. The routine proceeds to decision block 620, where the status update is checked to determine whether there is new information to download. The information may be content or instructions as shown in FIGS. 2C and 2D, respectively, and described above. The status update may, for example, be embedded in or attached to a Uniform Resource Identifier (URI) that is periodically obtained by the receiving client device in the manner described above and compared with prior acquisitions of that same URI to determine if the URI has changed. The URI changes may include the action items, a timestamp, and other information described above. The timestamp may correspond to a purchase by a user of content that is to be downloaded by that client. If the timestamp has changed from the prior URI, the receiving client device will know that it needs to establish a secure connection with the service provider to obtain content download instructions and/or to download content.

If there is no new information to download to the receiving client device 104a, the routine proceeds back to block 510, where new status updates may be obtained. If information is available for download, the routine proceeds to block 530, where a secure communication channel is established between the receiving client device 104a and the content download service provider 110. In one illustrative embodiment, a secure communication channel is established using data encryption. Alternatively, the secure connection may be established using a private persistent communication channel, such as a virtual private network. Next, at block 640, the receiving client device 104a downloads content (FIG. 2C) or instructions (FIG. 2D). The downloading of instructions (FIG. 2D) is followed by the downloading of content (FIG. 2E). As will be readily appreciated by those skilled in the art and others, the action identified in block 640, i.e., download content or instructions, as particularly described above, may include a variety of subactions that depend on how content downloading is to be accomplished. In order not to unduly lengthen this description, these subactions, which are well known to those skilled in the art of content downloading, are not further described here, except to recognize that content downloading can be accomplished in a variety of ways known to those skilled in the art of content downloading.

After the receiving client device 104a has downloaded the content or instructions, the process proceeds to decision block 650, where a check is made to determine whether additional actions are required to be taken by the receiving client device 104. For example, as noted above, the additional actions may include software updates, security patches, promotions for download, etc. If no additional actions are required, the process proceeds to block 670, where the process terminates. If additional actions are required, the process proceeds to block 660, where the additional actions are performed. The process then terminates at block 670.

Figure 7:
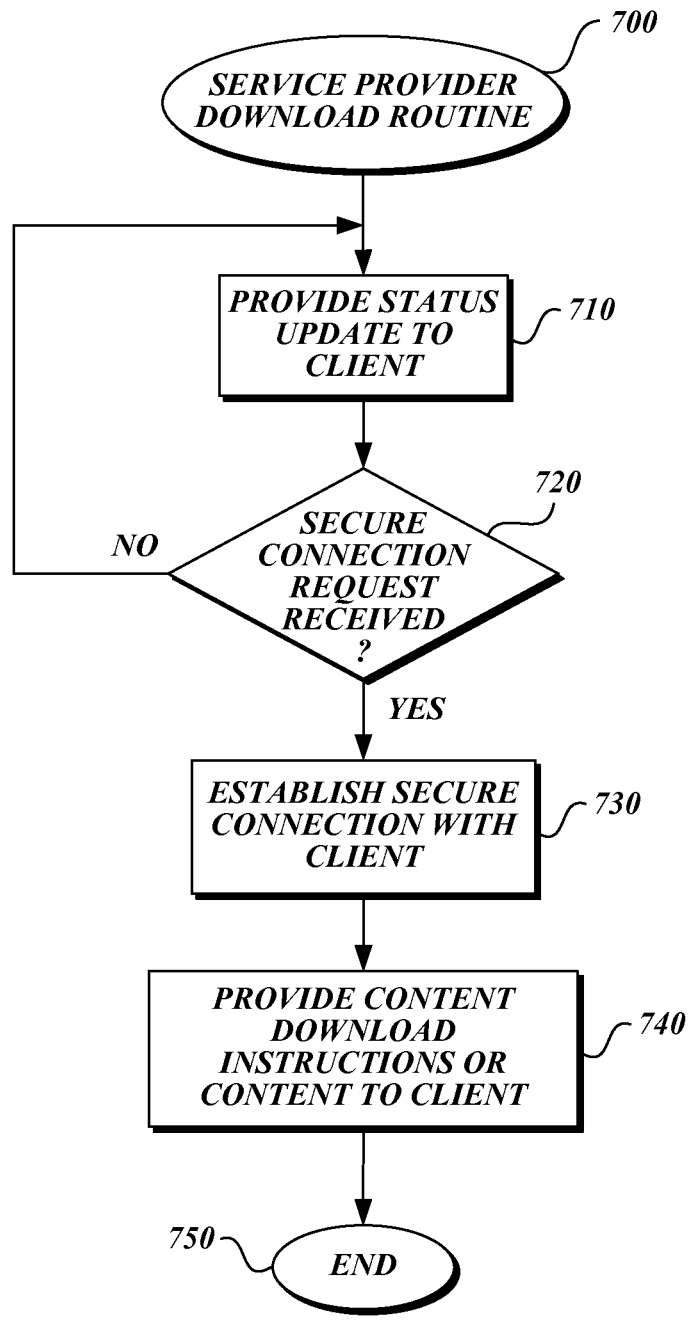
FIG. 7 is a functional flow diagram depicting an illustrative process employed by a content download service to control the downloading of content to a receiving client device.

FIG. 7 is a functional flow diagram depicting an illustrative process employed by the content download service 110 to control the downloading of content for to a receiving client device 104a. The content download service process begins at block 700 and proceeds to block 710, where status updates are provided to the receiving client device 104a. As noted above with respect to FIG. 6, the status update may be provided by the content download service 110 in a number of ways. The status updates may be provided to a receiving client device 104a in response to a polling request received from the receiving client device 104a, or by active notification to the receiving client device 104a. An active notice may be sent by the content download service 110, for example, when it receives a new request to download content from a requesting client device 108. The process then proceeds to decision block 720, where a check is made to determine whether a secure connection request has been received. If no such request has been received, the process returns to block 710, where new status update may be provided to the client. If a request for a secure connection has been received from the receiving client device as shown in FIG. 6, the process proceeds to block 730, where the secure connection is established. The process then proceeds to block 740, where the content download service 110 provides content download instructions (FIG. 2D) or content (FIG. 2C) to the receiving client device 104, as described above with respect to FIG. 6. The process then terminates at block 750.

While illustrative embodiments of the invention have been illustrated and described, it will be appreciated that various changes can be made therein without departing from the spirit and scope of the invention, as defined by the appended claims.

What is claimed is:

1. A system for delivering content, the system comprising:
a data store configured to store content; and
a first computing device in communication with the data store, the first computing device configured to:
receive a request from a second computing device to deliver content to a third computing device;
receive a status request from the third computing device;
in response to receiving the status request, generate a status update indicating whether the content requested by the second computing device is available for delivery to the third computing device; and
when the status update indicates that the content requested by the second computing device is available for delivery to the third computing device, send the status update to the third computing device;
receive a delivery request from the third computing device for the content requested by the second computing device, the delivery request being automatically generated by the third computing device in response to the status update, and
cause delivery of the content requested by the second computing device to the third computing device.

2. The system of claim 1, wherein the first computing device is further configured to store, in the data store, an association between the third computing device and a user.

3. The system of claim 1, wherein the status update comprises an action code indicating that the content requested by the second computing device is available for delivery to the third computing device.

4. The system of claim 3, wherein the action code is further configured to cause the third computing device to perform at least one of updating software and downloading a promotion.

5. The system of claim 1, wherein the first computing device is configured to receive periodic status updates from the third computing device.

6. The system of claim 1, wherein the first computing device is configured to cause delivery of the content to the third computing device from a fourth computing device.

7. The system of claim 1, wherein the first computing device is configured to cause delivery of the content to the third computing device from the data store in communication with the first computing device.

8. A computer-implemented method of controlling delivery of content, the computer-implemented method comprising:
requesting, by a software agent stored on a client computing device, a status update from a server, the status update indicating whether content is available for delivery to the client computing device;
determining, by the client computing device, whether the status update indicates that content is available for delivery to the client computing device;
automatically generating, by the software agent stored on the client computing device, a request to deliver content when the determining indicates that content is available for delivery to the client computing device, the content being available for delivery to the client computing device responsive to a prior request to deliver the content to the client computing device that is initiated by a computing device separate from the client computing device; and
receiving delivery of the content by the client computing device responsive to the automatically generating the request to deliver.

9. The method of claim 8, further comprising sending periodic status requests, by the software agent stored on the client computing device, to the server.

10. The method of claim 8, further comprising establishing, by the software agent stored on the client computing device, a secure connection between the client computing device and the server prior to beginning the receiving the delivery of the content.

11. The method of claim 8, wherein the status update comprises an action code.

12. The method of claim 11, further comprising processing the action code, by the software agent stored on the client computing device, to do at least one of: deliver content, update software, and download promotions.

13. The method of claim 11, wherein the status update comprises a time stamp associated with the action code.

14. The method of claim 8, wherein the receiving the delivery of the content comprises receiving a portion that is less than an entire larger content that includes the delivered content.

15. A client computing device comprising:

a data store configured to store a software agent; and a processor in communication with the data store, the processor configured to execute the software agent to control delivery of content to the client computing device, the software agent configured to:

send a status request from the client computing device to a server via a network;

receive a status update from the server via the network, the status update being sent to the client computing device in response to the status request, and the status update indicating whether content is available for delivery to the client computing device; and automatically request delivery of the content to the client computing device when the status update indicates that the content is available for delivery to the client computing device, the status update being generated in response to a prior request to deliver the content to the client computing device initiated by a different client computing device.

16. The device of claim 15, wherein the status update comprises an action code, and wherein the software agent is configured to request the delivery based on the action code.

17. The device of claim 15, wherein the client computing device comprises a user interface configured to render the content.

18. The device of claim 15, wherein the software agent is configured to send periodic status requests to the server via the network.

19. The device of claim 15, wherein the software agent is configured to automatically request delivery of the content from the server when the status update indicates that the content is available for delivery to the client computing device.

20. The device of claim 15, wherein the software agent is configured to establish a secure connection via the network, and wherein the client computing device is configured to receive the delivered content via the secure connection.

\* \* \* \* \*